United States Patent [19]

Tootle

[11] Patent Number: 4,841,844
[45] Date of Patent: Jun. 27, 1989

[54] FLUID ACTUATORS WITH LVDT FEEDBACK MECHANISMS

[75] Inventor: James N. Tootle, Kalamazoo, Mich.

[73] Assignee: Pneumo Corporation, Boston, Mass.

[21] Appl. No.: 402,995

[22] Filed: Jul. 29, 1982

[51] Int. Cl.⁴ .............................................. F01B 25/26
[52] U.S. Cl. ................................... 92/5 R; 74/89.14; 74/89.15; 74/89.17; 464/36
[58] Field of Search ...................... 91/1; 92/5 R, 5 L; 74/89.14, 89.15, 89.17; 464/36

[56] References Cited

U.S. PATENT DOCUMENTS

| | | | |
|---|---|---|---|
| 2,016,727 | 10/1935 | Roth | 91/1 |
| 3,003,470 | 10/1961 | Geyer | 92/17 |
| 3,118,291 | 1/1964 | Berglund | 464/36 |
| 3,403,365 | 9/1968 | Richards | 92/5 R |
| 4,226,316 | 10/1980 | Geisthoff | 464/36 |
| 4,386,689 | 6/1983 | Kato | 464/36 |

*Primary Examiner*—Deborah L. Kyle
*Assistant Examiner*—Richard L. Klein
*Attorney, Agent, or Firm*—Renner, Otto, Boisselle & Sklar

[57] ABSTRACT

A fluid actuator characterized by a linear variable differential transformer (LVDT) feedback mechanism driven off the actuator screw shaft for indicating actuator position. A protective clutch mechanism prevents possible damage to the LVDT or actuator in the event that the actuator stroke exceeds the design stroke of the LVDT.

23 Claims, 4 Drawing Sheets

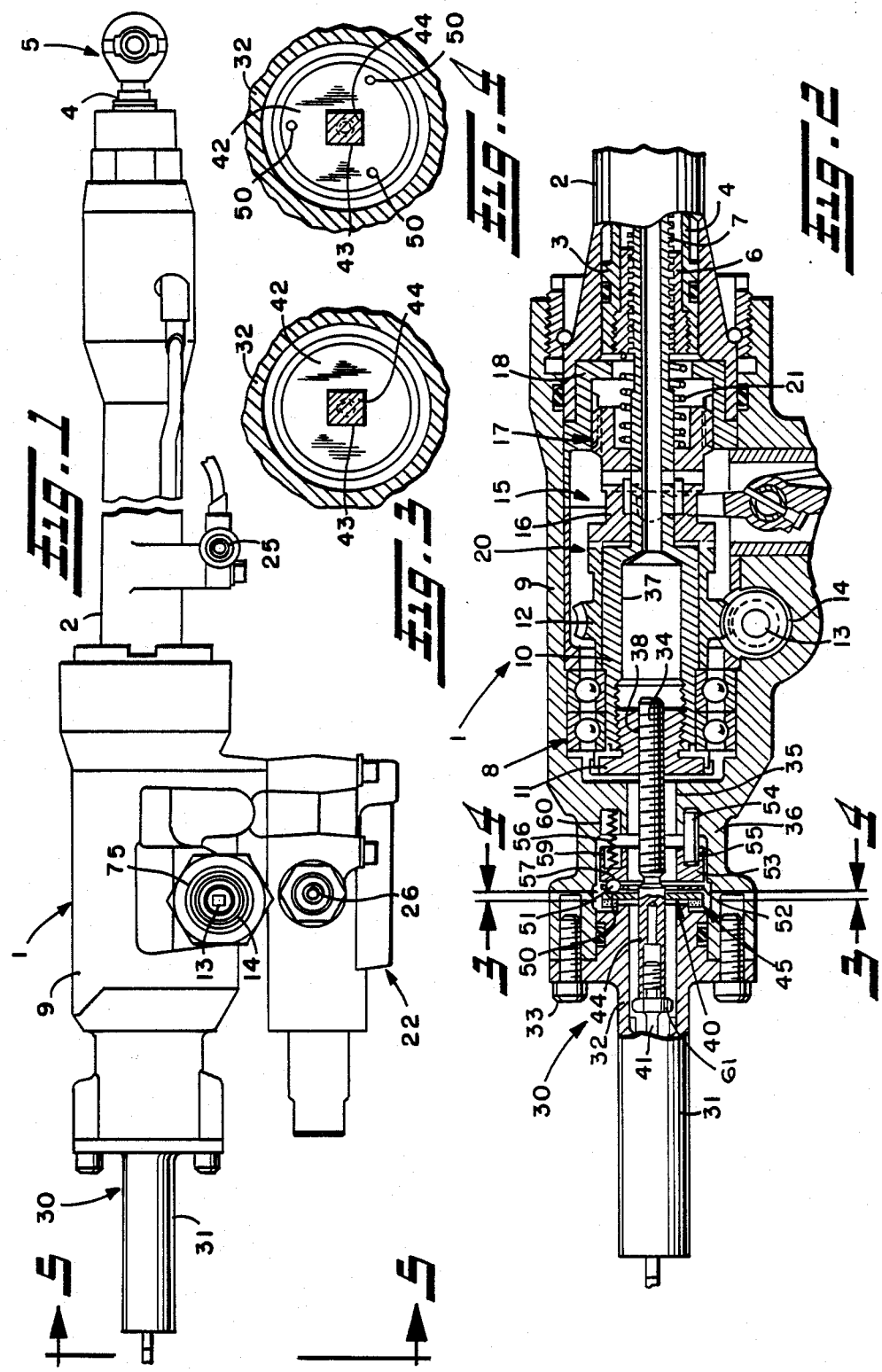

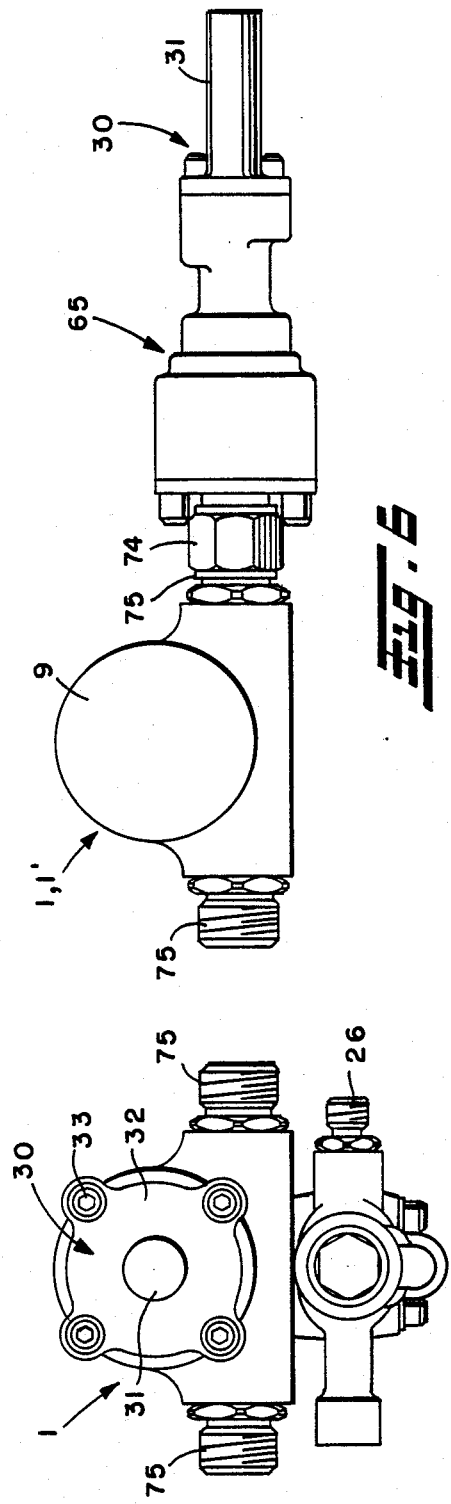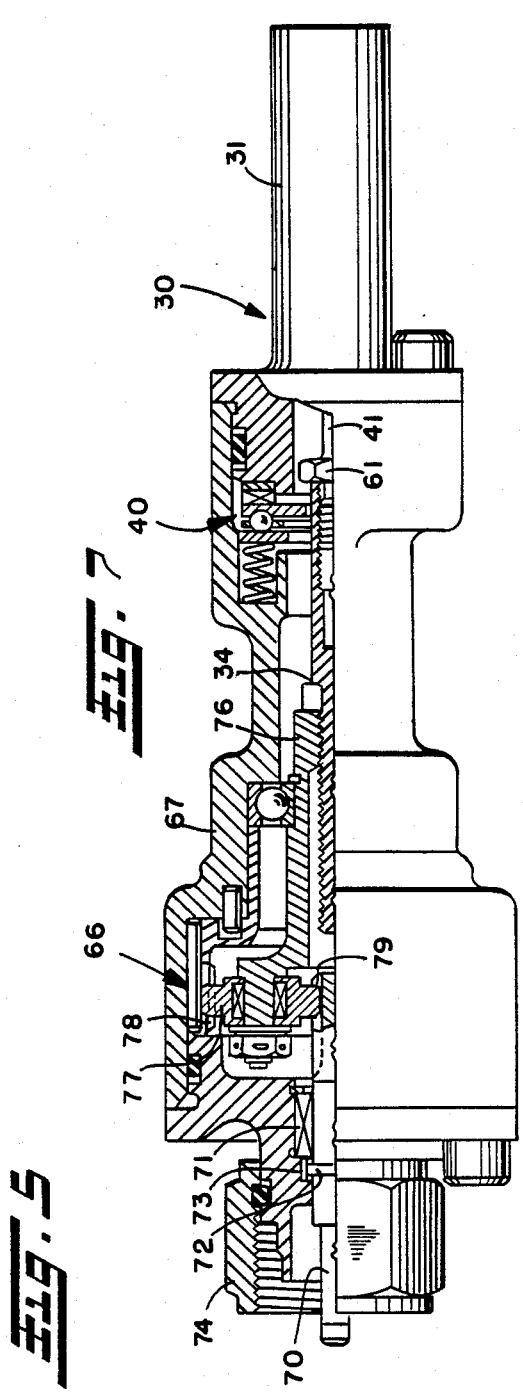

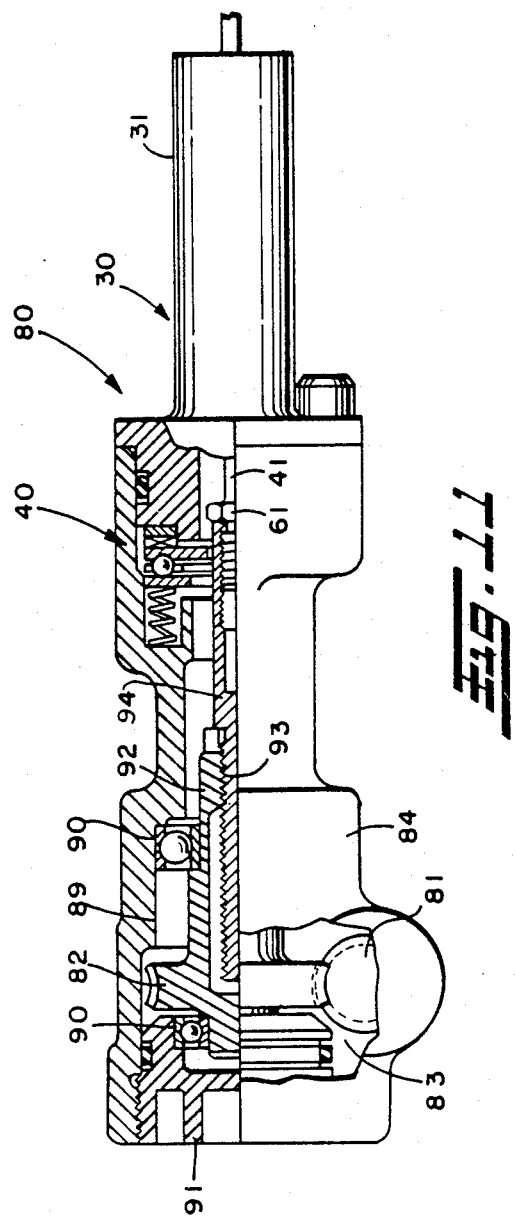

FLUID ACTUATORS WITH LVDT FEEDBACK MECHANISMS

DISCLOSURE

This invention relates generally as indicated to a fluid actuator with LVDT feedback mechanism for indicating the position of the actuator and particularly whether the actuator is in the fully extended or retracted position.

BACKGROUND OF THE INVENTION

In certain actuator installations it is important to be able to translate the actuator position to a remote location. For example, when the actuators are being used to actuate the thrust reversers for a jet engine on an aircraft, the pilot must know when the actuators are in the fully deployed or stowed position in that the engine throttle must be held at idle during either the deploy or stroke cycles as the actuator is extending or retracting. Previously, feedback mechanisms have been provided for this purpose. However, typically such feedback mechanisms were driven by the motion of the thrust reverser members, and such feedback mechanisms added considerably to the size and weight of the overall system.

SUMMARY OF THE INVENTION

With the foregoing in mind, it is a principal object of this invention to provide a fluid actuator in which an LVDT feedback mechanism is used to indicate actuator position.

Another object is to provide such an actuator in which the LVDT feedback mechanism is driven off the actuator screw shaft.

Still another object is to provide such an actuator in which damage to the LVDT and actuator is prevented in the event that the actuator stroke exceeds the design stroke of the LDVT.

These and other objects of the present invention may be achieved by providing the actuator in which an LVDT feedback mechanism is driven off the actuator screw shaft. In one form of the invention, the LDVT feedback mechanism is mounted on the inboard end of the actuator housing and directly driven by the actuator screw shaft.

In another form of the invention, the LVDT feedback mechanism may be mounted on the cross shaft of an actuator. In that event, a gear reducer is used to reduce the revolutions per stroke of the cross shaft to a number compatible with reasonable threads per inch of the LVDT lead screw.

One such gear reducer utilizes a planatery gear assembly to reduce the input rotary motion, whereas another arrangement uses a worm and worm wheel combination to achieve such gear reduction. When a planatery gear arrangement is used, the LVDT will be cantilevered straight out from the actuator cross shaft, whereas when a worm and worm wheel combination is used, the LVDT centerline will be parallel to the centerline of the actuator. Accordingly, it may be somewhat easier to support the LVDT from the actuator when a worm and worm wheel combination is used than when a planatery gear arrangement is used.

However, it is easier still to support the LVDT feedback mechanism in vibration using the first mentioned mounting arrangement, and such first mounting arrangement may also be made lighter in weight because of the direct drive connection between the LVDT and actuator screw shaft. Nevertheless, there may be instances when due to space considerations and the like it is preferred to use one of the other forms of the invention.

In each case, the feedback mechanisms may utilize the same size LVDT. Also, the same protective clutch mechanism may be used to prevent possible damage to the LVDT or actuator in the event that the actuator stroke exceeds the design stroke of the LVDT.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a fragmentary side elevation view of a preferred form of fluid actuator with LVDT feedback mechanism in accordance with the present invention;

FIG. 2 is an enlarged fragmentary longitudinal section through the inboard end of the actuator and LVDT feedback mechanism of FIG. 1 showing the drive connection therebetween;

FIGS. 3 and 4 are fragmentary transverse sections through the protective clutch mechanism for the LVDT feedback mechanism of FIG. 2, taken along the planes of the lines 3—3 and 4—4, respectively;

FIG. 5 is an end elevation view of the fluid actuator and LVDT feedback mechanism of FIG. 1 as seen from the plane of the line 5—5 thereof;

FIG. 6 is an end elevation view of a fluid actuator having another form of LVDT feedback mechanism connected to the cross shaft thereof;

FIG. 7 is an enlarged partial longitudinal section through the LVDT feedback mechanism of FIG. 6;

FIG. 11 is an enlarged fragmentary longitudinal section through the LVDT feedback mechanism of FIG. 10 taken substantially along the plane of the line 11—11 thereof.

DETAILED DESCRIPTION OF THE PREFERRED EMBODIMENTS

Figure 8:
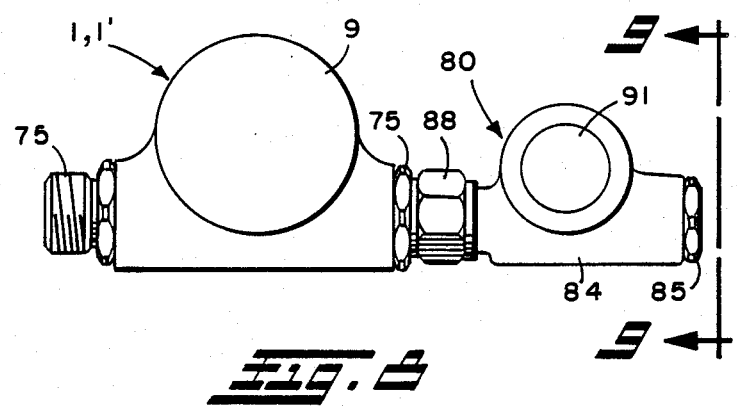
FIG. 8 is an end elevation view of an actuator similar to FIG. 6, but having yet another form of LVDT feedback mechanism in accordance with this invention connected to the cross shaft thereof.
Figure 9:
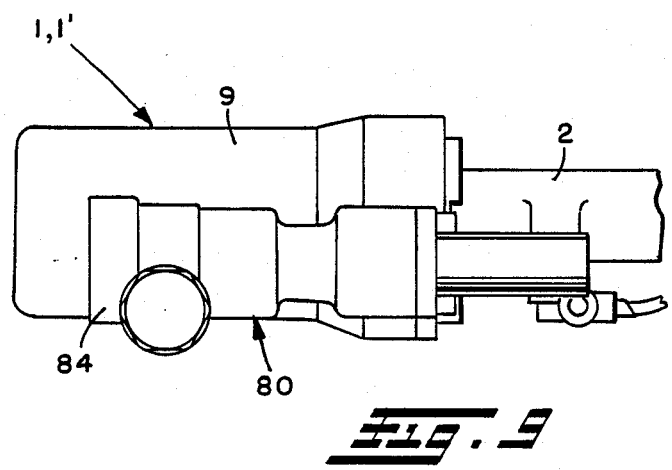
FIG. 9 is a partial side elevation view of the actuator and LVDT feedback mechanism of FIG. 8 as seen from the plane of the line 9—9 thereof.

Referring now in detail to the drawings, and initially to FIGS. 1–5, one form of fluid actuator in accordance with this invention is designated generally by the reference numeral 1. Such actuator may be used, for example, for the controlled positioning of a thrust reverser for a jet engine on an aircraft, and may be substantially of the type disclosed in copending U.S. application Ser. No. 352,046, filed Feb. 24, 1982, the disclosure of which is incorporated herein by reference.

Briefly, such locking actuator includes a cylinder 2 containing a piston 3 axially movable therein. Attached to the piston is a hollow rod 4 which extends through the rod end of the cylinder and has a rod end assembly 5 on its outboard end to facilitate connection to the movable part of the device to be actuated. A suitable trunnion mount or the like may also be provided on the cylinder to facilitate connection to the other part of the device to be actuated.

The piston has a high lead Acme nut 6 in the center thereof which is coupled to a mating Acme screw shaft 7. One end of the actuator screw shaft may be journaled in suitable bearings 8 within an actuator housing 9 attached to the head end of the cylinder, whereas the other end of the actuator screw shaft extends into the hollow piston rod and a substantial distance beyond the nut. As the piston moves back and forth in the cylinder, the actuator screw shaft rotates at a speed proportional to the velocity of the piston.

The bearings 8 may be held in place on the enlarged outer end portion 10 of the actuator screw shaft 7 by a bearing retainer 11 which may be threadedly connected to the screw shaft and locked thereto for rotation therewith.

Attached to the enlarged outer end portion of the actuator screw shaft is a high lead worm wheel 12 which mates with a worm shaft 13 mounted for rotation within a transverse bore 14 in the actuator housing 9. Since the speed of the worm shaft is also proportional to the velocity of the piston rod, when the worm shafts of two or more actuators are connected together by a synchronous drive shaft or the like, they will be mechanically synchronized in both position and motion, as well known in the art.

When the locking actuator is in the fully retracted or stowed position shown in FIGS. 1 and 2, such actuator may be locked in such position by a suitable lock mechanism 15, which may be of the type disclosed in the aforementioned copending application Ser. No. 352,046. As shown, such lock mechanism includes a movable lock sleeve 16 axially movable toward and away from the adjacent end of the worm wheel 12. A splined connection 17 is provided between the movable lock sleeve and a piston stop 18 within the actuator housing to prevent rotation of the lock sleeve within the actuator housing while permitting limited axial movement therewithin.

The adjacent end faces of the worm gear and movable lock sleeve have cooperating lock teeth 20 thereon with ramp angles which when engaged permit ratcheting of the worm gear relative to the movable lock sleeve during retraction of the piston but not during extension thereof. Accordingly, the piston will continue to retract until it engages the retract stop 18. However, if at any time an attempt is made to reverse the piston direction while such lock teeth are in contact with each other, the lock teeth will instantly engage thus locking the screw shaft against rotation and preventing the piston from extending.

When the piston is fully retracted, the movable lock sleeve 16 is normally maintained in engagement with the worm gear 12 by a lock spring 21 interposed between the movable lock sleeve and piston head 3. During retraction of the actuator, as the piston approaches the end of its stroke, the piston head compresses the lock spring, causing the teeth on the movable lock sleeve to move into engagement with the teeth on the worm gear.

Before the actuator can be extended, the lock sleeve 16 must be moved away from the worm wheel 12 to disengage the lock teeth 20, and then system pressure must be applied to the extend side of the actuator. Preferably, both such functions are accomplished by actuation of a sequence-power valve 22 which may also be of the type disclosed in the aforementioned copending application.

Before system pressure is supplied to the sequence-power valve to release the lock mechanism 15, system pressure is desirably applied to the retract end of the actuator through a retract port 25 to remove any axial tension loads on the actuator which might otherwise interfere with release of the lock. Then, with system pressure still applied to the retract port, system pressure is also applied to the sequence-power valve 22 through a lock-in port 26 to release the lock mechanism as previously described.

After the lock mechanism has been released, the system pressure may be ported to the extend end of the actuator through suitable passages in the sequence-power valve 22 and actuator housing 9. Since the area of the actuator piston 3 exposed to the extend pressure is greater than that exposed to the retract pressure, the actuator will extend.

To retract the actuator, the pressure acting on the extend end of the actuator is reduced, as by connecting the lock-in port 26 to return pressure, while still maintaining system pressure on the retract end of the actuator. When the actuator piston is fully retracted, the actuator will be precluded from extending by the lock mechanism until system pressure is once again supplied to the sequence-power valve first to unlock the lock mechanism and then to supply system pressure to the extend end of the actuator in the manner previously described.

Additional actuators of the same or similar construction with or without the lock mechanism and associated sequence-power valve may be mechanically synchronized both in position and motion with the locking actuator 1 by connecting the worm shafts of such actuators together by flex shafts or the like. The extend pressure acting on the extend end of the locking actuator may also be transmitted to the extend ends of the other actuators through sealed tubes surrounding the flex shafts, whereby extend pressure will be simultaneously applied to the extend ends of all of the actuators, but not before the lock mechanism has been released. The retract ends of all of the actuators may similarly be interconnected by pressure conduits to ensure that the same system pressure is also simultaneously applied thereto.

During either the deploy or stow cycle, as the actuator is extending or retracting, the engine throttle must be held at idle. Accordingly, it is important that a signal be translated from the actuator to the cockpit of the aircraft to indicate the position of the actuator and more particularly when the actuator reaches the fully deployed or stowed position.

In the actuator construction disclossed in the present application, such actuator position is made known by an electrical position sensor 30 which is connected to the actuator to supply an electrical signal to the cockpit indicating such actuator position. Preferably, such electrical position sensor consists of a linear variable differential transducer 31 (LVDT) which may be driven off the actuator screw shaft 7 of a locking actuator either by coupling the LVDT directly to the actuator screw shaft in the manner shown in FIG. 2 or to the cross shaft 13 of either a locking or nonlocking actuator as shown in FIGS. 6–11.

In the FIGS. 1–5 embodiment, the housing 32 for the LVDT is shown attached to the outboard end of the actuator housing 9 by a plurality of mounting bolts 33. The lead screw 34 for the LVDT extends through an axial bore 35 in the actuator housing end wall 36 into a central recess 37 in the enlarged outer end portion of the actuator screw shaft 7 and has threaded engagement with an internal threaded central bore 38 in the bearing retainer 11. The lead screw is normally restrained against rotation by a protective clutch mechanism 40, whereby rotation of the actuator screw shaft will cause the LVDT lead screw 34 and thus the LVDT probe 41 threadedly connected thereto to move axially at a rate and position proportional to the piston rod 4. As it does so, the probe will move axially to a greater or lesser extent within the LVDT 31 to generate an electrical signal corresponding to the position of the actuator.

Referring further to FIG. 2, and also to FIGS. 3 and 4, the clutch mechanism 40 desirably consists of a ball ratchet plate 42 having a non-circular (for example, a square) central hole 43 therethrough for sliding engagement along a correspondingly shaped length or section 44 of the LVDT drive shaft. Between the outer side of the ball ratchet plate and the adjacent end of the LVDT housing 32 is a needle bearing assembly 45 which permits rotation of the ball ratchet plate relative to the LVDT housing when an overstroke condition occurs as described hereafter. The other side of the ball ratchet plate has a plurality of circumferentially spaced conical ball pockets or recesses 50 adapted to receive a corresponding number of balls 51 which are supported for movement into and out of the ball pockets by a ball guide ring 52. For example, there may be three such conical ball pockets and three balls for receipt in any one of the pockets.

The balls 51 are normally retained in the respective pockets 50 in the ball ratchet plate by a spring washer 53 which is prevented from rotating relative to the actuator housing 9 by a plurality of pins 54 attached to the actuator housing and extending into sockets 55 in the spring washer. Springs 56 interposed between the spring washer 53 and actuator housing 9 urge the spring washer toward the balls, thus loading the balls, which resists movement of the balls out of the pockets in the ball ratchet plate. Similarly shaped conical pockets 57 may also be provided in the spring washer 53 for providing additional resistance to movement of the balls out of the ball ratchet plate pockets 50. Aligned sockets 59, 60 may be provided in the spring washer 53 and actuator housing 9, respectively, to receive the ends of the springs.

During normal operation of the actuator, the balls of the clutch mechanism will remain in their respective pockets thus preventing rotation of the ball ratchet plate 42 which in turn prevents rotation of the LVDT lead screw 34 and probe 41. Accordingly, rotation of the actuator screw shaft 7 will cause axial translation of the LVDT lead screw and LVDT probe connected thereto to generate an electrical signal proportional to the actuator stroke. By proper selection of the number of threads per inch on the LVDT lead screw, the axial movement of the lead screw and probe will be substantially less than the piston stroke.

If during assembly of the actuator in a thrust reverser installation, the piston rod 4 is rotated, it might be possible to exceed the design stroke of the LVDT, which could result in damage to the LVDT or the actuator itself except for the clutch mechanism 40 which prevents the LVDT from overstroking as described hereafter.

During extension or retraction of the actuator piston, if the stroke of the LVDT does not properly match the actuator piston stroke, the actuator screw shaft 7 will try to overstroke the LVDT probe 41 in one direction or the other. When this happens, a large hex wrenching nut 61 on the outer end of the LVDT probe will bottom out either on the LVDT itself or on the ball ratchet plate thus preventing further axial movement of the LVDT lead screw in the same direction.

If the actuator screw shaft continues to try to drive the LVDT lead screw in the same direction, the resisted axial movement of the LVDT lead screw will cause a build-up in the torque applied to the ball ratchet plate. When the torque reaches the preset clutch torque, the balls 51 will be forced to roll out of their conical pockets 50, 57 forcing the spring washer 53 against the springs 56. Since the ball ratchet plate is no longer restrained against rotation by the balls in their pockets, the plate and thus the LVDT lead screw and probe are free to rotate along with the actuator screw shaft. Such rotation of the ball ratchet plate occurs with very little friction until the piston stops moving because the plate 42 rolls between the balls 51 and the needle bearing 45.

If the piston 3 continues to move far enough, the balls 51 will drop into the next set of pockets 50, 57 and roll out with little or no change in the clutch pre-torque. Since the balls are free to roll in and out of the pockets, the clutch mechanism does not depend upon a friction coefficient and has very stable torque release settings.

The LVDT feedback mechanisms and protective clutch mechanisms shown in the FIGS. 6–11 embodiments discussed below may be substantially the same as those shown in the FIGS. 1–5 embodiment, and accordingly the same reference numerals are used to designate like parts. They differ primarily in the manner in which they are coupled to the actuator itself. Both of the other two LVDT feedback mechanisms are designed to mount on the cross-shaft 13 of either a locking or nonlocking actuator 1 or 1'. This requires the use of a gear reducer to reduce the number of revolutions per stroke of the cross shaft to a number compatible with reasonable threads per inch of the LVDT drive shaft.

In the embodiment shown in FIGS. 6 and 7, the LVDT feedback mechanism 65 is cantilevered straight out from the actuator cross-shaft 13 and utilizes a planatery gear assembly 66 to reduce the rotary input motion to the LVDT lead screw. The housing 67 for the planatery gear assembly has the LVDT housing 31 bolted to the outer end thereof with the protective clutch mechanism 40 interposed between opposed surfaces of the planatery gear housing and LVDT housing, similar to the FIGS. 1–5 embodiment.

At the axial inner end of the planatery gear housing is a drive shaft 70 journaled for rotation by a roller bearing 71 and retained within the housing by a shaft retainer pin 72 extending through the drive shaft into an annular groove 73 in the housing. The outermost end of the drive shaft 70 extends beyond the housing 67 and has a non-circular cross section for driving engagement in a correspondingly shaped hole or recess in the end of the actuator cross shaft 13. A tube coupling nut 74 at the inner end of the planatery gear housing is adapted to be threaded onto a fitting 75 on the actuator housing 9 surrounding the ends of the transverse bore 14 in which the cross shaft 13 is journaled for securing the LVDT feedback mechanism to the actuator housing.

Since the speed of the actuator cross shaft 13 is proportional to the velocity of the actuator piston rod 4, the drive shaft 70 will similarly rotate at a speed proportional to the velocity of the piston rod. Such rotary motion of the drive shaft 70 is transmitted to the LVDT lead screw 34 by a planatery drive shaft 76 which has one end keyed to the LVDT lead screw and a plurality of planatery gears 77 on the other end in meshing engagement both with a ring gear 78 secured to the inner wall of the planatery gear housing 67 and gear teeth 79 on the inner end of the drive shaft 70.

Figure 10:
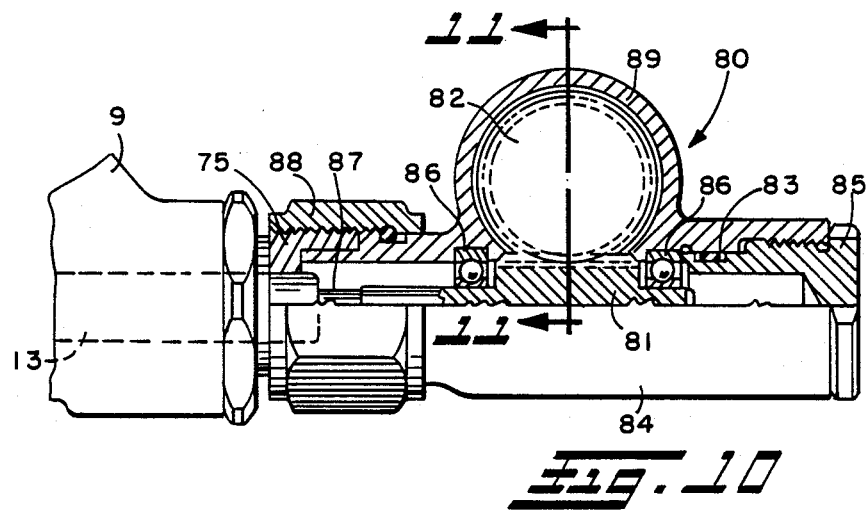
FIG. 10 is an enlarged side elevation view of the LVDT feedback mechanism of FIG. 8 with portions broken away to show the mechanism used to reduce the rotary output of the actuator cross shaft.

The LVDT feedback mechanism 80 shown in FIGS. 8-11 uses a worm 81 and worm wheel 82 combination to provide a gear reduction to reduce the input rotary motion of the actuator cross shaft 13 to the LVDT lead screw. As seen in FIGS. 10 and 11, there is a transverse bore 83 through the gear reducer housing 84 in which the worm shaft 81 is journal mounted. Secured to the outer end of the transverse bore 83 is a worm bearing retainer 85 for retaining the bearings 86 and worm shaft 81 therewithin. The worm shaft has a non-circular shaft extension 87 on the outer end thereof which is adapted to be received in a correspondingly shaped hole or recess in the actuator cross shaft 13 for rotation of the worm shaft by the cross shaft. Surrounding the worm shaft extension is a tube coupling nut 88 which may be threaded onto the fitting 75 on the actuator housing 9 surrounding the ends of the cross shaft for attaching the LVDT feedback mechanism to the actuator housing.

The gear reducer housing 84 also contains a longitudinal bore 89 extending at right angles to the transverse bore 83 and parallel to the longitudinal axis of the actuator 1 or 1'. Journal mounted within the longitudinal bore is the worm wheel 82 which has meshing engagement with the worm shaft 81. The worm wheel and bearings 90 therefor are secured within the longitudinal bore by an end cap retainer 91 at one end of the longitudinal bore. At the other end of the longitudinal bore is the LVDT 31 which is mounted to the housing 84 adjacent such other end by mounting bolts or the like. The protective clutch mechanism 40 is also contained within the housing 84 adjacent the other end of the longitudinal bore to prevent the possibility of damaging the LVDT or actuator in the event that the piston rod movement exceeds the design stroke of the LVDT as previously described. The worm wheel 82 has a tubular shaft 92 on one end for receipt of one end of the LVDT lead screw 94. Between the worm wheel shaft and LVDT lead screw is a threaded connection 93, whereby rotation of the worm wheel by the worm shaft causes axial movement of the LVDT lead screw and probe 41 connected thereto.

The gear reducer of the FIGS. 8-11 embodiment requires fewer parts than the gear reducer shown in FIGS. 6 and 7. Also, the center line of the LVDT of the FIGS. 8-11 embodiment is parallel to that of the actuator, thus making it easier to support the LVDT from the actuator that when the LVDT is cantilevered straight out from the actuator cross shaft as in FIGS. 6 and 7.

From the foregoing, it will now be apparent that the fluid actuators of the present invention include a novel mechanism for driving an LVDT for accurately determining the position of the actuators and particularly whether the actuators are fully extended or retracted. The LVDT is either directly connected to the actuator screw shaft or indirectly driven thereby through the cross shaft, whereby as the piston moves back and forth, the LVDT probe moves at a speed proportional to the velocity of the piston. In either event, the same protective clutch mechanism may be used to prevent possible damage to the LVDT or actuator in the event that the actuator stroke exceeds the design stroke of the LVDT.

Although the invention has been shown and describes with respect to certain preferred embodiments, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A fluid actuator comprising a cylinder, a piston axially movable in said cylinder, a rotatable member operatively connected to said piston such that axial movement of said piston causes rotation of said rotatable member, and means driven by said rotatable member for indicating the axial position of said piston, said means including an LVDT having a probe whose movements are proportional to the rate of movement and position of said piston, said LVDT including a lead screw, and means for causing axial movement in said lead screw in response to rotation of said rotatable member, said probe being connected to said lead screw for axial movement therewith, and said means for causing axial movement of said lead screw comprising a clutch mechanism for restraining said lead screw against rotation, said clutch mechanism including means for permitting rotation of said lead screw and probe connected thereto with said rotatable member whenever the stroke of said actuator exceeds the design stroke of said LVDT to prevent possible damage to said LVDT and actuator during such an overstroke condition.

2. A fluid actuator as set forth in claim 1, said clutch mechanism including a plate having a central opening through which said lead screw extends, said central opening and the portion of said lead screw passing through said opening having a corresponding non-circular shape permitting axial movement of said lead screw relative to said plate but not relative rotational movement, and means for restraining said plate against rotation which also restrains said lead screw against rotation.

3. A fluid actuator as set forth in claim 2 wherein said means for restraining said plate against rotation comprises a plurality of balls adapted to be received in a corresponding number of pockets in one side of said plate, and means for urging said balls into said pockets to resist rotation of said plate.

4. A fluid actuator as set forth in claim 3 wherein said means for urging comprises a washer, means for preventing rotation of said washer, and spring means for urging said washer towards said balls, thus loading said balls in said pockets, which resists movement of said balls out of said pockets.

5. A fluid actuator as set forth in claim 4 further comprising additional pockets in said washer for receipt of said balls, said additional pockets providing additional resistance to movement of said balls out of said pockets in said plate.

6. A fluid actuator as set forth in claim 2 further comprising needle bearings between said LVDT and said plate to permit said plate to rotate relative to said LVDT following such torque build-up.

7. A fluid actuator as set forth in claim 1 wherein said LVDT is mounted on the inboard end of said actuator in coaxial alignment with said rotatable member.

8. A fluid actuator as set forth in claim 1 wherein said means for causing axial movement of said lead screw comprises a second member attached to said rotatable member for rotation therewith, said second member having a threaded opening therethrough in which said lead screw is threadedly received.

9. A fluid actuator as set forth in claim 1 further comprising a cross shaft rotatably driven by said rotatable member, and means for causing axial movement of said lead screw in response to rotation of said cross shaft by said rotatable member.

10. A fluid actuator as set forth in claim 9 wherein said means for causing axial movement of said lead screw comprises gear reducer means between said cross shaft and lead screw.

11. A fluid actuator comprising a cylinder, a piston axially movable in said cylinder, a rotatable member operatively connected to said piston such that axial movement of said piston causes rotation of said rotatable member, and means driven by said rotatable member for indicating the axial position of said piston, said means including an LVDT having a probe whose movements are proportional to the rate of movement and position of said piston, said LVDT including a lead screw, and means for causing axial movement of said lead screw in response to rotation of said rotatable member, said probe being connected to said lead screw for axial movement therewith, and said means for causing axial movement of said lead screw comprising a clutch mechanism for restraining said lead screw against rotation, said LVDT including stop means for resisting axial movement of said probe beyond its design stroke, and said clutch mechanism including means responsive to a build-up in torque resulting from such resistance to axial movement of said probe to permit rotation of said lead screw and probe connected thereto with said rotatable member whenever the stroke of said actuator exceeds the design stroke of said probe to prevent possible damage to said LVDT and actuator during such overstroke condition.

12. A fluid actuator as set forth in claim 11 wherein said stop means comprises a shoulder on said probe which bottoms out on said LVDT and on said clutch mechanism at the opposite ends of the design stroke of said probe to prevent further axial movement of said probe in the same direction.

13. A fluid actuator as set forth in claim 12 wherein said shoulder is formed by a hex wrenching nut on said probe.

14. A fluid actuator comprising a cylinder, a piston axially movable within said cylinder, an actuator screw shaft operatively connected to said piston for rotational movement during axial movement of said piston, an LVDT having a probe, a means operatively connecting said probe to said actuator screw shaft for causing axial movement of said probe in response to such rotational movement of said actuator screw shaft, such axial movement of said probe being proportional to the rate of movement and position of said piston, said means for causing axial movement of said probe comprising clutch means for restraining said probe against rotation, said clutch means including means for permitting rotation of said probe with said actuator screw shaft whenever the stroke of said actuator exceeds the design stroke of said probe to prevent possible damage to said LVDT and actuator during such an overstroke condition.

15. A fluid actuator as set forth in claim 14 wherein said LVDT is mounted on the inboard end of said actuator in coaxial alignment with said actuator screw shaft.

16. A fluid actuator as set forth in claim 15 wherein said LVDT includes a lead screw having a threaded connection with one end of said actuator screw shaft, said clutch means being operative to restrain said lead screw against rotation, whereby rotation of said actuator screw shaft in opposite directions causes axial inward and outward movement of said lead screw relative to said actuator screw shaft, said probe being connected to said lead screw for axial movement therewith.

17. A fluid actuator as set forth in claim 14 further comprising a cross shaft driven by said actuator screw shaft, said LVDT including a lead screw, and means for causing axial movement of said lead screw in response to rotation of said cross shaft by said actuator screw shaft, said probe being connected to said lead screw for axial movement therewith.

18. A fluid actuator as set forth in claim 17 wherein said means for causing axial movement of said lead screw comprises gear reducer means between said cross shaft and lead screw.

19. A fluid actuator as set forth in claim 18 wherein said gear reducer means comprises a planatery gear mechanism to reduce the input rotary motion from said cross shaft to said lead screw.

20. A fluid actuator as set forth in claim 19 wherein said LVDT is cantilevered straight out from said cross shaft.

21. A fluid actuator as set forth in claim 18 wherein said gear reducer means comprises a worm and worm wheel combination.

22. A fluid actuator as set forth in claim 21 wherein said worm is driven by said cross shaft and said lead screw is driven by said worm wheel.

23. A fluid actuator as set forth in claim 22 wherein said worm is in coaxial alignment with said cross shaft, and the axes of said worm wheel and LVDT are parallel to the axis of said actuator.

* * * * *